United States Patent [19]

Kindl et al.

[11] 4,417,816

[45] Nov. 29, 1983

[54] LASER MEASURING SYSTEM AND METHOD FOR TURNING MACHINE

[75] Inventors: George F. Kindl, Newington; Orean E. Michaud, Bristol; Joseph E. Brien, East Hartford, all of Conn.

[73] Assignee: Colt Industries Operating Corp., West Hartford, Conn.

[21] Appl. No.: 277,651

[22] PCT Filed: Aug. 11, 1980

[86] PCT No.: PCT/US80/01043

§ 371 Date: Aug. 11, 1980

§ 102(e) Date: Aug. 11, 1980

[87] PCT Pub. No.: WO82/00514

PCT Pub. Date: Feb. 18, 1983

[51] Int. Cl.³ .............................. G01B 11/10
[52] U.S. Cl. ............... 356/357; 33/DIG. 4; 33/DIG. 21; 82/34 R
[58] Field of Search ...... 33/174 L, DIG. 21, DIG. 4; 356/345, 351, 355–358; 82/2, 2.5, 2.7, 21 R, 34 A, 34 R

[56] References Cited

U.S. PATENT DOCUMENTS

| | | | |
|---|---|---|---|
| 3,191,470 | 6/1965 | Pabst et al. | 82/36 A |
| 3,409,375 | 11/1968 | Hubbard | 356/106 |
| 3,520,613 | 7/1970 | Chitayat | 356/345 |
| 3,749,500 | 7/1973 | Carlson et al. | 356/156 |
| 3,750,245 | 8/1973 | Kennedy et al. | 82/36 A |
| 3,791,739 | 2/1974 | Kawasaki | 356/106 R |
| 3,812,376 | 5/1974 | Takeyama et al. | 250/572 |
| 3,878,742 | 4/1975 | Lahm | 82/2 B |
| 4,038,890 | 8/1977 | Winget | 82/2 B |

OTHER PUBLICATIONS

Watanabe et al, Rec. Electr. & Commun. Eng. Conversatione, Tohoka Univ. (Japan) vol. 45, No. 4, (Nov. 1976).
Barringer et al, "A Commercial Laser Interferometer for Length Measurement by Fringe Counting," Radio & Electr. Engineer., 40 (1): 49–55, Jul. 1970.
Rowley, R. C., "Lasers in Interferometric Distance Measurement" Colloquium on Optical Techniques for Measurement in Control, Oct. 1970 (pp. 1–4).
Hewlett Packard Technical Data, Jun. 15, 1975, pp. 1–4 and 6.
Hewlett Packard Technical Data, Sep. 1979, pp. 1–12.

*Primary Examiner*—Bruce Y. Arnold
*Attorney, Agent, or Firm*—Radford W. Luther; Richard A. Dornon

[57] ABSTRACT

A laser measuring system is associated with a two axis turning machine (10), having a tool turret (12), to permit the dimensions of a machined part to be ascertained without removal of the part or workpiece from the chuck (18) of the machine. A gage head (36), which includes a retroflector (40), is mounted upon the turret which is indexible to a measuring station in which part measurements may be taken. The turret is mounted upon an X-axis slide (32) movable perpendicular to the chuck axis which, in turn, is mounted upon a Z-axis slide (26) movable parallel to the chuck axis. An interferometer (48) if fixedly attached to the Z-axis slide so as to be in alignment with the retroflector when the retroflector is in the measuring station. A Laser beam source (52) and a beam receiver (54) are mounted on or adjacent the machine such that they are in proper alignment with the interferometer. A collar (20) on the chuck furnishes a reference surface which functions as a fixed gage calibration point.

10 Claims, 10 Drawing Figures

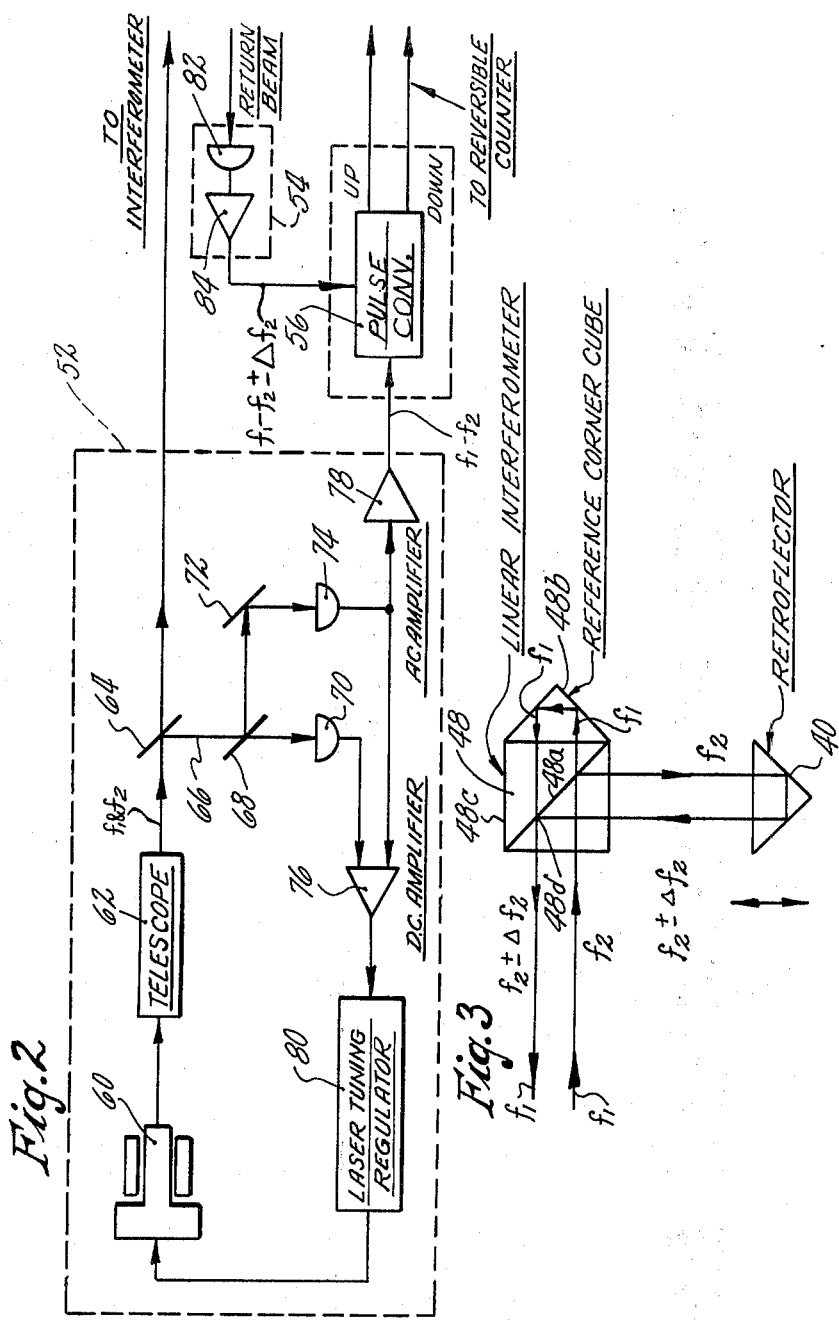

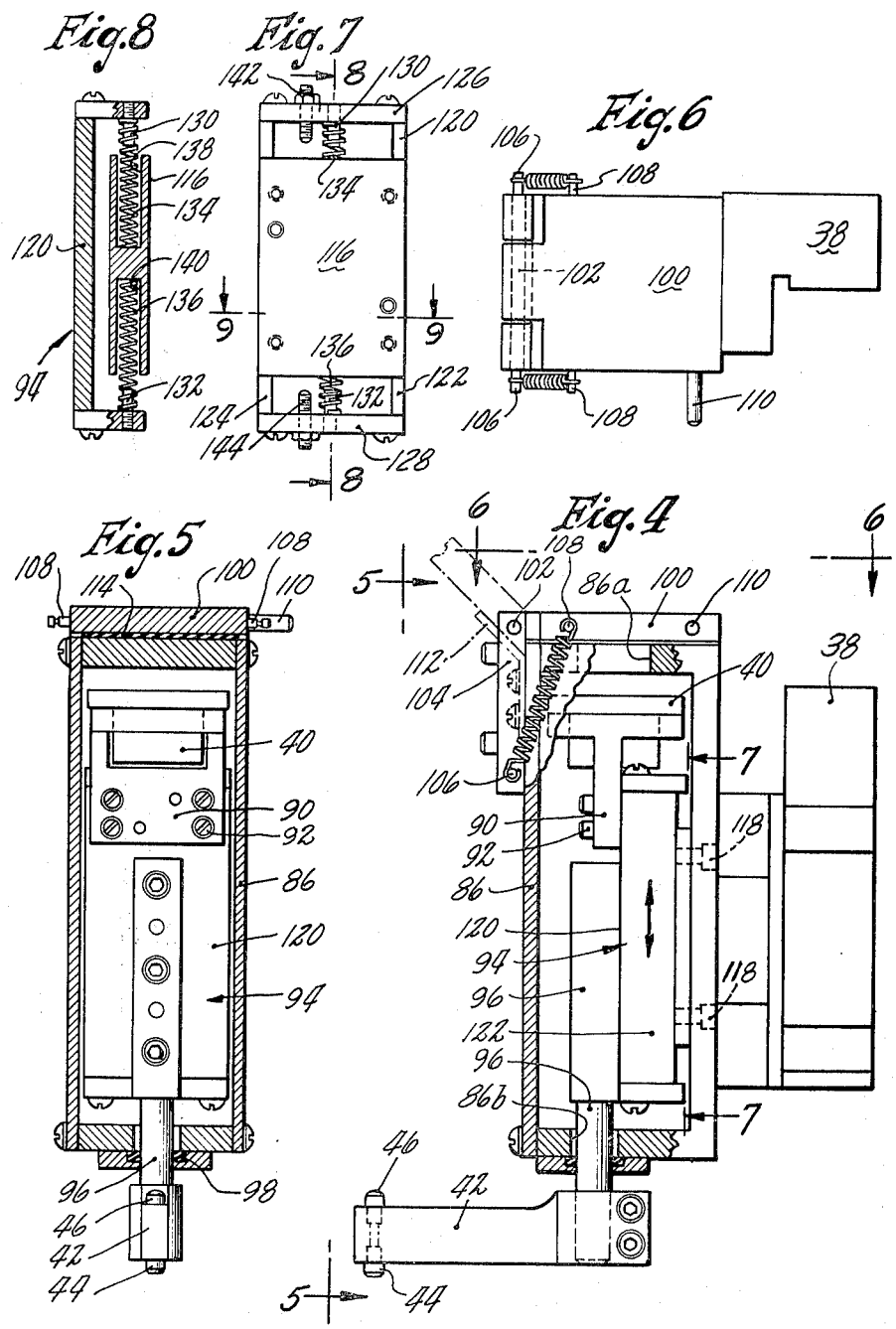

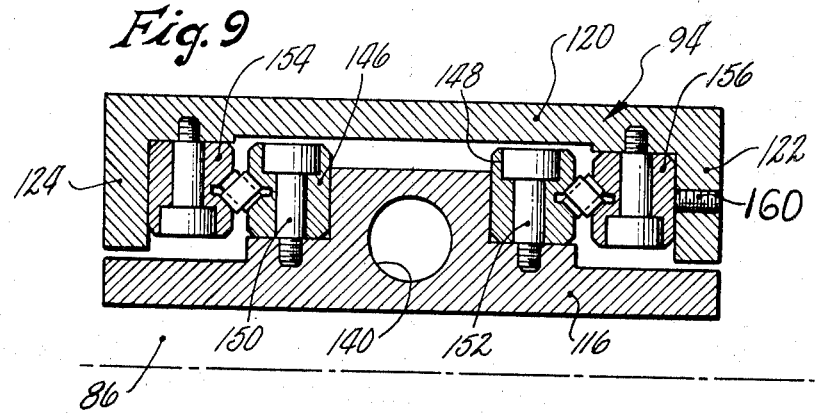
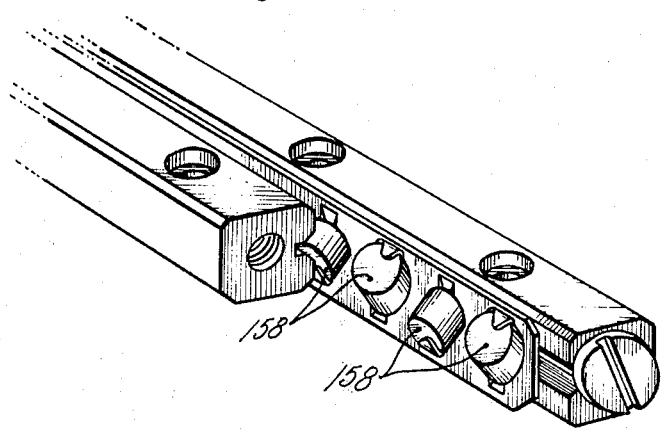

LASER MEASURING SYSTEM AND METHOD FOR TURNING MACHINE

TECHNICAL FIELD

This invention relates to laser measuring systems for machine tools.

BACKGROUND ART

There are a number of factors which influence the dimensional accuracy of a workpiece which can be achieved in a turning operation. Illustrative of such factors, are: the accuracy of the mechanisms which control machine tool slide movement; the deformation of the machine tool and the workpiece due to cutting force; the heat generated during cutting; and the extent of tool wear. The prior art has recognized that the aforementioned unpredictable factors are not susceptible to effective operator monitoring and in response has provided laser optical devices adapted to generate beams which impinge on the periphery of a workpiece, such as shown in U.S. Pat. Nos. 3,749,500 and 3,812,376. Such prior are systems have a drawback in that they require positioning units which can be relatively complex. In addition, such systems do not offer the many advantages of laser interferometry.

Currently, some numerically controlled machine tools employ laser interferometry to precisely position the slides of the machine to obtain superior resolution. Typically such systems embody a laser source and one or more receivers, interferometer and retroflector sets. However, laser interferometry has not been adapted to directly measure the dimensions of a turned workpiece.

DISCLOSURE OF THE INVENTION

In accordance with the invention, laser interferometry is employed to directly measure the interior or exterior dimensions of a turned workpiece. The only positioning apparatus required for a system is that which is typically incorporated in a two axis lathe or chucker.

In brief, a lathe or chucker, having a tool carrying turret mounted upon an X-axis slide movable perpendicular to the spindle axis, is provided with a gage head incorporating a reflector adapted to be positioned for measurement by an indexing rotation of the turret to a particular index station. An interferometer is fixedly mounted upon a Z-axis slide (which carries the X-axis slide) movable parallel to the spindle axis. The interferometer is aligned with the reflector in the gage head when the turret is in the measurement index station and is always aligned with a laser source and receiver mounted upon the machine tool frame or adjacent thereto. The chuck is encircled by a master reference collar of known diameter (internal as well as external) whereby a reference point may be established when the gage head engages the inner or outer periphery of the collar.

A measuring system of the invention may be utilized to determine and compensate for excessive tool wear. For example, a correction signal could be transmitted to the slide position control device of the machine tool when the machining error is greater than a specified dimensional tolerance. In addition, a system of the invention could be employed to determine size of a part just prior to or upon the completion of a final finishing operation. It will of course be appreciated that, under all circumstances, the accuracy of a measuring system of the invention does not depend upon the precision with which the machine tool slides are positioned but is independent thereof.

Accordingly, it is a primary object of the invention to provide a system for measuring the dimensions of a turned workpiece which utilizes laser interferometry.

Another object is to provide a laser interferometer based system and method for measuring the dimensions of a workpiece machined upon a two axis turret lathe wherein the turret thereof includes a gage head incorporating a reflector and the axial slide has an interferometer mounted thereupon.

These and other objects and advantages of the invention will become more readily apparent from the following detailed description when taken in conjunction with the accompanying drawings, in which:

BRIEF DESCRIPTION OF DRAWINGS

FIG. 2 is a block diagram depicting the basic elements of the laser transducer and the receiver of FIG. 1 and their relationship to other components of the system.

FIG. 3 is a schematic view of the linear interferometer and retroflector arrangement of FIG. 1 illustrating the beam paths and the principle of operation.

FIG. 4 is a side elevational view, partly in section, of the gage head of FIG. 1.

FIG. 5 is a front elevational view of the gage head, partly in section, taken substantially along the line 5—5 of FIG. 4.

FIG. 6 is a top view of the gage head, taken substantially along the line 6—6 of FIG. 4.

FIG. 7 is a rear elevational view of the gage's roller slide assembly, per se, taken substantially along the line 7—7 of FIG. 4.

FIG. 8 is a side elevational view, partly in section, of the roller slide assembly, taken substantially along the line 8—8 of FIG. 7.

FIG. 9 is a sectional view of the roller slide assembly, taken substantially along the line 9—9 of FIG. 7.

FIG. 10 is a perspective view showing the engagement between the right side rail and a V-way of FIG. 9.

BEST MODE OF CARRYING OUT THE INVENTION

Figure 1:
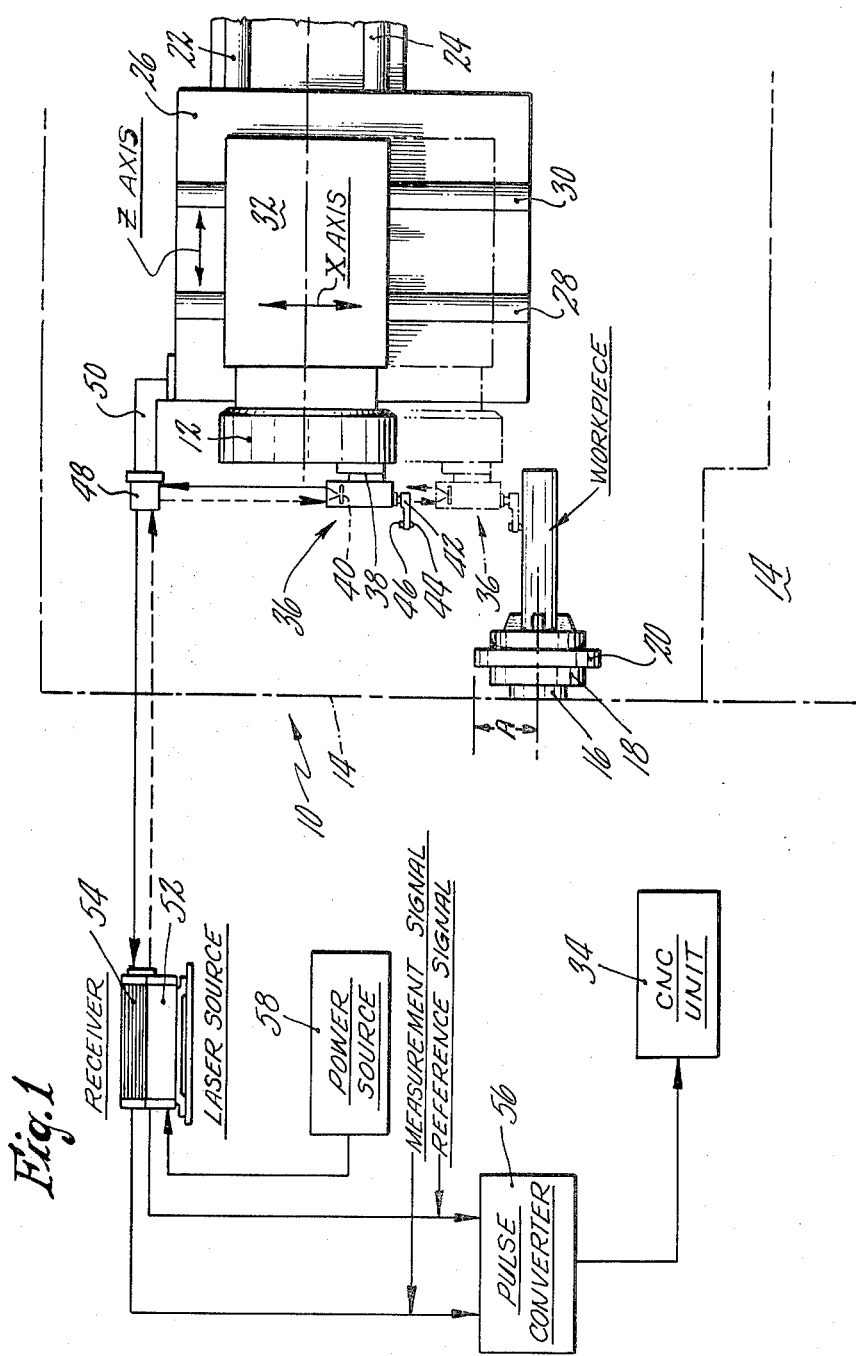
FIG. 1 is a schematic diagram of a preferred embodiment of a laser measuring system of the invention.

Referring to FIG. 1, there is shown a numerically controlled lathe or chucker, generally shown at 10, incorporating a measuring system of the invention. The particular form of lathe shown embodies a vertically indexing turret 12 capable of movement along two axes. This type of lathe (sometimes termed a universal lathe) is well-known in the art and an example thereof is illustrated in U.S. Pat. No. 3,191,470. It will be appreciated that, although the invention is specifically illustrated and described with reference to a machine tool having a vertically indexing turret, it is also applicable to other lathes or chuckers.

The lathe 10 embodies a frame 14, the outline of which is shown by phantom lines. Mounted upon the frame for rotation about a horizontal axis is a spindle 16 having a workpiece holding chuck 18 attached thereto. The chuck also has a master reference collar 20 (discussed hereinafter) mounted upon the chuck in encircling relationship thereto. A pair of longitudinally extending ways 22 and 24 are secured to frame 14 for guiding the longitudinal motion (Z-axis) of a Z-axis slide 26. Carried by the Z-axis slide 26 are ways 28 and 30 upon which is slideably mounted an X-axis slide 32. The X-axis is, of course, perpendicular to both the Z-axis and the chuck or workpiece axis. The turret 12 is mounted for rotation upon the X-axis slide 32 to a plurality of discrete index stations about an axis parallel to the chuck axis. The turret may be configured to carry a plurality of turning tools, a plurality of boring tools or both turning tools and boring tools. Slide positioning and turret indexing are controlled by a computer numerical control unit (CNC) 34 which commands all machine tool operations.

A gage head, generally indicated at 36, is fixedly mounted upon the turret 12 at an index station by means of a bracket 38. The heart of the gage head is a reflector 40 (which in this case is a retroflector) which is movable with a gage arm 42 having O.D. (Outside diameter) and I.D. (Inside diameter) tips or probes 44 and 46, respectively. In the measuring index station depicted in FIG. 1, the retroflector 40 is in precise alignment with an interferometer 48 (which in this case is a linear interferometer). The interferometer 48 is rigidly secured to the Z-axis slide 26 by means of an L-shaped mounting arm 50. Hence, any movement of the Z-axis slide 26 when the turret is at the measuring index station does not in any manner affect the alignment of the interferometer and the reflector 40. In like manner, movement of the X-axis slide does not alter alignment but only the distance between the interferometer 48 and the reflector 40.

A laser transducer 52 is the source of the laser beam directed at the interferometer 48, the outgoing main beam being shown by a dashed line. A portion of the outgoing main beam (shown by dashed line) is directed by the interferometer to the reflector 40 which sends a return beam (solid line) back to the interferometer in a latterally offset and parallel relationship. The return beam from the reflector interferes with another portion of the main beam in the interferometer to produce a return main beam (solid line) directed at a receiver 54. The return main beam is offset from and parallel to the outgoing main beam. The receiver 54, which senses the main return beam generates an RF measurement signal which is applied to a pulse converter 56. The receiver also incorporates a means to verify proper alignment. The pulse converter 56 also receives an RF reference signal from the laser transducer 52. The RF measurement and reference signals are transformed by the Pulse converter 56 into displacement information in pulse format (e.g., up pulses and down pulses) which can be utilized, for example, by a reversible counter (not shown) in the CNC unit 34. A power supply 58 functions to provide the laser transducer 52 with a positive voltage D.C. supply and a negative voltage D.C. supply.

The basic optical elements of the measuring system of the invention, i.e., the retroflectors, linear interferometer, Laser tranducer, receiver and pulse converter units are all commercially available items manufactured, for example, by the Hewlett Packard Co. The detailed construction of the aforementioned elements, of course, forms no part of the present invention; and it will be understood that other suitable elements could be employed in a measuring system of the invention. However, the laser transducer, receiver linear interferometer and retroflector will be cursorily described to facilitate a better understanding of the present invention.

Turning to FIG. 2, the Laser transducer 52 and the receiver 54 are depicted in block diagram form. The laser transducer 52 comprises a low power Helium-Neon laser 60 which emits a coherent light beam composed of two slightly different optical frequencies, $f_1$ and $f_2$ of opposite circular polarizations. After conversion to orthogonal linear polarizations, the beam is expanded and collimated at 62 and then directed to the reference beam splitter 64 where a small fraction of both frequencies is split off. The downwardly directed portion 66 of the beam is used both to generate a reference frequency and to provide an error signal to the laser cavity tuning system. Beam portion 66 impinges upon a polarizing beam splitter 68 which splits beam 66 into a portion directed to a photodetector 70 and a portion directed at a mirror 72, which, in turn, reflects the portion to another photodetector 74. The output signal of photodetector 70 is directed to an input terminal of D.C. amplifier 76. The output signal of photodetector 74 is directed both to another input terminal of D.C. amplifier 76 and an AC amplifier 78, the latter of which generates the reference signal $f_1 - f_2$ which is one of the inputs to the pulse converter 56. The output of the D.C. amplifier 76 (the difference in the amplitudes of $f_1$ and $f_2$) is applied to a tuning regulator 80 which is connected to the laser 60.

The receiver 54, which senses the main return beam via a photodetector 82, includes an amplifier 84, connected thereto, which produces the measurement signal $f_1 - f_2 \pm \Delta f_2$. Relative motion between the linear interferometer 48 and the retroflector 40 causes a dopler shift ($\pm \Delta f_2$) in the difference frequency ($f_1 - f_2$) measured by the receiver 54. This Doppler modulated difference frequency ($f_1 - f_2 \pm \Delta f_2$) is, of course, amplified by amplifier 84 to become the measurement signal.

The pulse converter 56 receives the reference and measurement signals and compares them cycle-by-cycle. The pulse converter 56 produces an appropriate up or down output pulse whenever one of the signals is one-half cycle ahead of or behind the other. Each pulse corresponds to a retroflector movement of one-quarter wavelength of light. These pulses are directed to the computer numerical control for counting therein.

With reference to FIG. 3, the linear interferometer 48 and its relationship to the retroflector 40 are displayed schematically. The outgoing main beam exiting from the laser transducer 52 is split into a laser reference beam and a laser measurement beam at the surface of a polarizing beam splitter 48a with one frequency ($f_1$) reflected to a reference cube corner 48b (i.e., a retroflector) mounted on the interferometer housing 48c. The other frequency ($f_2$) is transmitted to the retroflector 40 and returned ($f_2 \pm \Delta f_2$) parallel to, but displaced from, the outgoing beam. Both return beams interfere with each other at point 48d from where both frequencies are directed back along a common axis to the receiver as the main return beam. The retroflectors are comprised by high quality cube-corners which have the property that incident laser beams are reflected parallel to the incoming direction within seconds of arc and retain their coherence. Such retroflectors are notably advantageous in that their alignment during installation is not subjected to critical tolerances.

The detailed construction of the gage head 36 is shown in FIGS. 4-10. The gage head includes a housing 86 which has mounting bracket 38 secured thereto whereby it may be attached to an index station of the turret 12. The retroflector 40 is cradled within a support 90 so as to be upwardly facing to receive and emit light beams through an aperture 86a in the top of the housing 86. The support 90 is attached by means of screws 92 to a slide 94 which is axially movable vertically relative to the housing 86. To the surface of the slide 94 is attached a depending shaft 96 which is secured to the gage arm 42 (which carries probes 44 and 46) at its lower extremity. Shaft 96 extends downwardly through an opening 86b in the lower portion of the housing 86 and is encircled by a seal 98 attached to the base of the housing for preventing the entry of contaminating fluids, such as cutting coolant. Hence, it will be noted that the gage arm 42, shaft 96, slide 94, support 90 and retroflector 40 form an integral structure and are movable in unison relative to housing 86 when the probes 44 and 46 are contacted.

In order to prevent contaminants from entering aperture 86a when the gage is not in use, a cover 100 is pivotally mounted upon a pin 102 supported by a bracket 104 attached to the front of the housing. The bracket 104 and the cover 100 incorporate latterally projecting pins 106 and 108 for mounting springs which hold the cover 100 closed or open. A handle 110 is provided for opening the cover; and a stop 112, which is secured to the housing, limits the extent of its opening. When closed, the cover rests upon a gasket 114 which acts to seal out contaminants.

The slide 94 is mounted for axial sliding movement upon a base 116 which is securely fastened to the housing 86 by means of screws 118. The slide and base assembly is shown in detail in FIGS. 7, 8, 9, and 10. The slide 94 comprises a table 120 having longitudinal sides 122 and 124 and end plates 126 and 128 which together define an open box-like structure. As best shown in FIGS. 7 and 8, the end plates include pins 130 and 132 inserted therein which function as mounting guides for springs 134 and 136. The springs are mounted in cavities 138 and 140 in the base 116 for biasing the slide 94 to the neutral or intermediate position depicted when displaced therefrom. The end plates also include stop bolts 142 and 144 for limiting slide travel in both upward and downward directions.

Turning to FIG. 9, it may be seen that the base includes two roller strips 146 and 148 attached to the body thereof by mounting screws 150 and 152. The slide also incorporates a pair of V-ways 154 and 156 secured to the table 120 by mounting screws similar to those associated with the roller strips. The sliding interengagement between the V-ways and roller strips is occasioned by respective axial arrays of crossed roller bearings 158. As shown in FIG. 10 the roller bearings 158 in each strip have alternately opposed axes. Screw 160 allows for preload adjustment. A slide assembly, as shown, permits superior travel accuracies to be attained. The basic elements of such a slide assembly are commercially available from Micro Slides Inc. of Westbury, N.Y.

In a typical OD operation, the workpiece is machined to final rough OD dimensions. The turret 12 is then indexed, (i.e., rotated) to the measuring station whereby the retroflector 40 is aligned with the linear interferometer 48 and the gage head 36 is also aligned with a diameter of the workpiece. The gage head 36 is then moved over the master references collar 20 by moving the Z-axis slide 26 to the left as viewed in FIG. 1 until the probe 44 on the gage arm 42 is aligned with the diameter of the collar. Next, the X-axis slide is moved downwardly until the probe 44 firmly engages the outer periphery of the collar 20. The cover 100 on the gage head 36 is now opened to expose the retroflector 40. Also, at the same time, a cover (should one be provided) on the linear interferometer is opened. The opening of covers could be performed manually or by automatic means such as air cylinders or solenoids. Alignment is now verified by a signal (e.g., a DC voltage or warning light) from the receiver 54 which indicates that the main return beam is being properly received. The distance A is subsequently preset into a memory register in the CNC unit 34 whereupon workpiece measurements are ready to be taken.

The Z-axis slide 26 is then moved to the right until the probe 44 overlies that axial station on the workpiece where the diameter is to be measured. Next, the X-axis slide 32 moves downwardly toward the workpiece, as viewed in FIG. 1. During this downward travel, the distance between the linear interferometer 48 and retroflector 40 is continuously increasing, thereby causing the pulse converter 56 to issue forth a stream of pulses to the CNC unit 34, the pulses functioning to decrement the number A stored in the CNC unit. When pulse generation by the pulse converter 56 terminates during X-axis slide movement, the probe 44 has engaged the workpiece and the number in the CNC unit is an extremely precise measurement of a workpiece OD dimension. Similar OD measurements may be taken at other axial stations by simple slide movement without the need for placing the probe 44 again upon the collar 20. During such latter mentioned movements, the pulse converter will, of course, generate incrementing or decrementing pulses to the CNC unit register. Various measurements at different axial stations may be transferred to respective memory locations in the CNC unit.

The gage head is then removed from the workpiece (e.g., to a home position). The part program is then adjusted for the difference in the programmed and measured dimensions and final workpiece finishing is then completed. If desired, final workpiece dimensions may be checked as previously described. Any excessive variation between measured diameters and programmed diameters may indicate excessive tool wear or some other difficulty and corrective action is accordingly mandated.

Measurement of internal diameters may be made by using a similar procedure and contacting the inner periphery of the workpiece with probe 46. It will be noted that for such measurements, an interior reference surface could be provided on the collar, or alternatively, the distance between the tips of the probes could be precisely measured.

At the conclusion of a measuring operation, all covers are closed and the laser transducers and receivers turned off. Cutting cycles are resumed using measured values to properly position the X-axis slide. It will, of course, be understood that all measurements are predicated on the continuity of the laser alignment signal. Loss of this signal during measuring will render subsequent readings unreliable.

Obviously, many modifications and variations are possible in light of the above teachings without departing from the scope or spirit of the invention as defined in the appended claims. For example, a system of the invention could be associated with a lathe having a dual or single level turret mounted on the X-axis slide and rotatable about an axis parallel to the X-axis and intersecting the spindle axis in orthoginal or canted relationship thereto. Such a lathe is shown in U.S. Pat. No.

3,878,742. In addition, the invention could be utilized with a lathe as shown in U.S. Pat. No. 3,750,245. Furthermore it is within the ambit of the invention to utilize other forms of gage heads, reflectors or interferometers with appropriate positioning of the receiver and laser transducer.

We claim:

1. In an optical workpiece measuring system for a turning machine having: a frame; a spindle mounted for rotation upon the frame and having a chuck secured thereto for rotation therewith; a Z-axis slide mounted upon the frame for movement along an axis parallel to the spindle axis; an X-axis slide carried by the Z-axis slide for movement along an axis transverse to the spindle axis; and a turret mounted upon the X-axis slide for rotation to a plurality of discrete index stations; the improvement comprising:

a gage head having a movable probe adapted to engage a surface of the workpiece and a reflector movable with the probe for receiving and reflecting a laser measurement beam;

a bracket connected to the gage head, and an index position on the turret for securing the gage head to the turret such that when the turret is in a measuring index station the probe is adapted to be aligned with a diameter of the workpiece;

an interferometer for splitting a laser beam into a reference beam and the measurement beam and for reuniting the reference beam and the measurement beam to form a return beam, the interferometer being mounted upon the Z-axis slide such that it is in optical alignment with the reflector when the turret is in the measuring index station;

a laser transducer adapted to generate the laser beam positioned in optical alignment with the interferometer; and a receiver for receiving the return beam and generating a measurement signal positioned in optical alignment with the interferometer.

2. The improvement of claim 1, further comprising: a reference collar of known diameter mounted upon the chuck in encircling relationship thereto adapted to be engaged by the probe for establishing a reference position.

3. The improvement of claim 2, wherein the gage head comprises:

a housing;

a slide mounted in the housing for axial movement therein;

a gage arm operatively connected to the slide for movement therewith, the probe being carried by the gage arm;

a support attached to the slide, the reflector being craddled within the support; and means to bias the slide to an intermediate position.

4. The improvement of claim 1, wherein the turret is of the type which is rotatable about an axis parallel to the spindle axis.

5. A method of optically measuring the dimensions of a workpiece machined by a turning machine having a chuck for holding the workpiece, a Z-axis slide movable parallel to the chuck axis, an X-axis slide mounted upon the Z-axis slide so as to be movable perpendicular to the chuck axis, and an indexible turret mounted upon the X-axis slide comprising the steps of:

indexing the turret to a measuring station;

moving the X-axis slide toward the workpiece until a gage head mounted on the turret engages the workpiece; and directing a laser measurement beam at a reflector in the gage head while moving the X-axis slide toward the workpiece.

6. The method of claim 5, further comprising: moving the X-axis slide and the Z-axis slide to cause the gage head to engage a master reference collar on the chuck before the gage head is brought into engagement with the workpiece.

7. The method of claim 5, wherein the directing of the laser measurement beam comprises:

directing a laser beam from a laser transducer to an interferometer mounted on the Z-axis slide in optical alignment with the reflector, the interferometer being adapted to split the laser beam into a reference beam and the measurement beam and to reunite the reference beam and the measurement beam to form a return beam.

8. The method of claim 7, wherein the indexing of the turret comrises:

rotating the turret about an axis parallel to the chuck axis.

9. In an optical workpiece measuring system for a turning machine having: a frame; a spindle mounted for rotation upon the frame and having a chuck secured thereto for rotation therewith; a Z-axis slide mounted upon the frame for movement along an axis parallel to the spindle axis; an X-axis slide carried by the Z-axis slide for movement along an axis transverse to the spindle axis; and a turret mounted upon the X-axis slide for rotation to a plurality of discrete index stations; the improvement comprising:

a gage head having a movable probe adapted to engage a surface of the workpiece;

first optical means movable with the probe for receiving a laser measurement beam;

a bracket connected to the gage head, and an index position on the turret for securing the gage head to the turret such that when the turret is in a measuring index station the probe is adapted to be aligned with a diameter of the workpiece;

second optical means mounted upon the Z-axis slide in optical alignment with the first optical means when the turret is in the measuring index station for establishing a measurement path for the measurement beam, one of the optical means being adapted to split a laser beam into a reference beam and the measurement beam and reunite the beams to form a return beam and the other of the optical means being adapted to reflect the measurement beam back to the said one of the optical means;

a laser transducer adapted to direct the laser beam to one of the optical means; and a receiver for receiving the return beam from the said one of the optical means and for generating a measurement signal.

10. A method of optically measuring the dimensions of a workpiece machined by a turning machine having a chuck for holding the workpiece, a Z-axis slide movable parallel to the chuck axis, an X-axis slide mounted upon the Z-axis slide so as to be movable perpendicular to the chuck axis, and an indexible turret mounted upon the X-axis slide comprising the steps of:

indexing the turret to a measuring station;

moving the X-axis slide toward the workpiece until a gage head mounted on the turret engages the workpiece; and directing a laser beam at the gage head while moving the X-axis slide toward the workpiece.

* * * * *